April 28, 1942.                W. C. ROBINSON ET AL                2,281,111
                                NONMETALLIC SHEATH CABLE
                               Filed Sept. 23, 1939          2 Sheets-Sheet 1
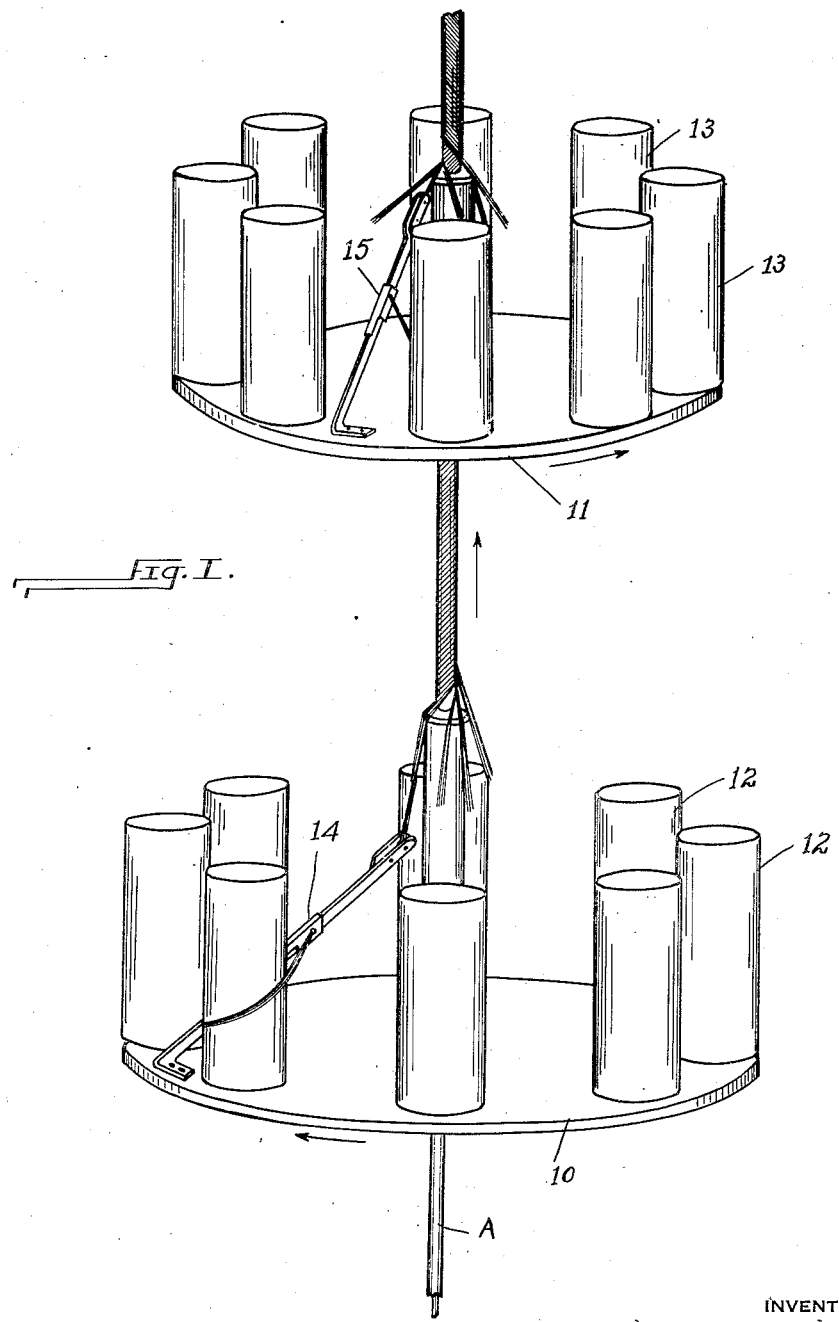
Fig. I.
INVENTORS
William C. Robinson, and
Ralph W. E. Moore
by Christy and Wharton
    attorneys

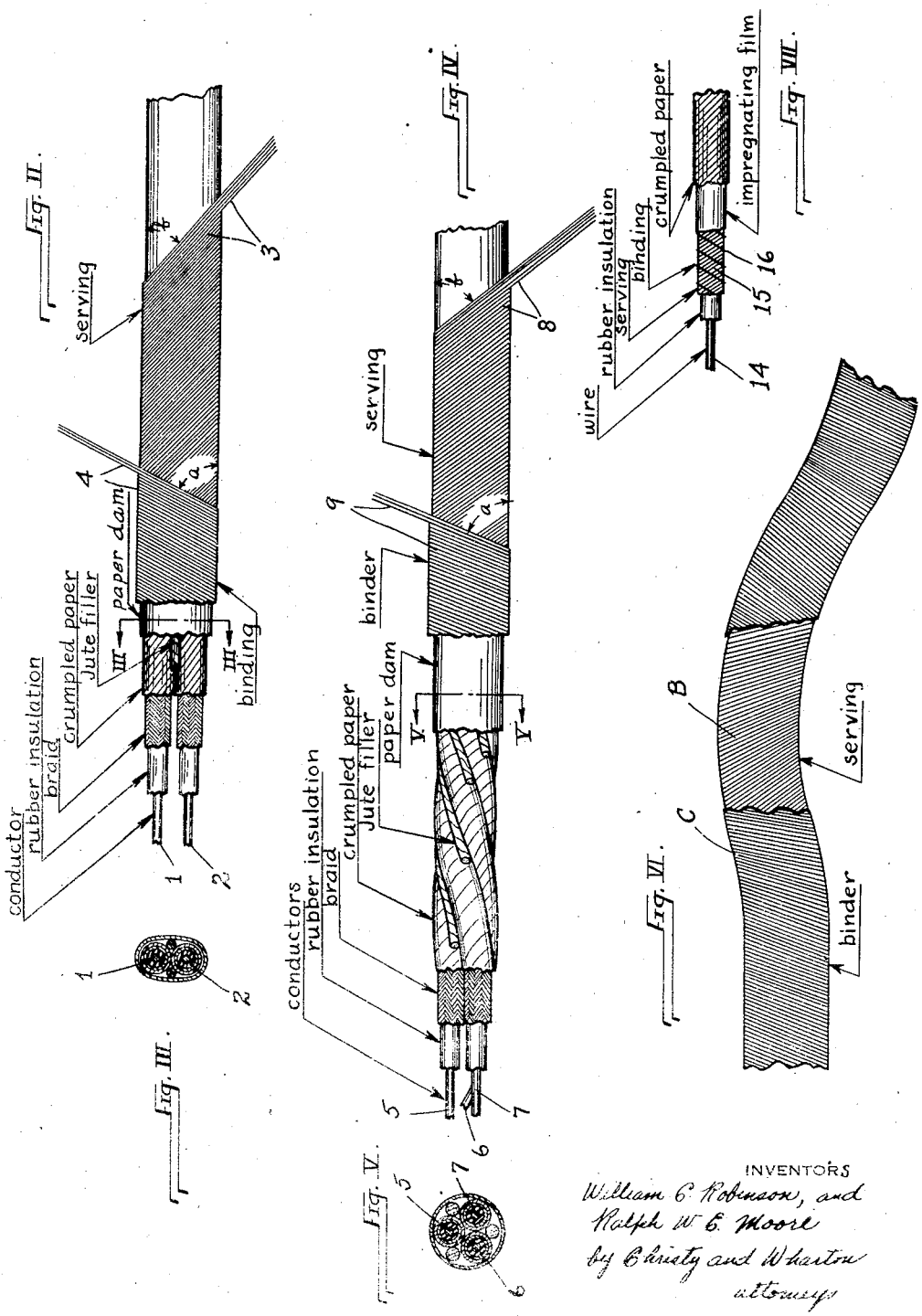

Patented Apr. 28, 1942

2,281,111

UNITED STATES PATENT OFFICE 2,281,111

NONMETALLIC SHEATH CABLE

William C. Robinson, Sewickley, Pa., and Ralph W. E. Moore, Riverdale, N. Y., assignors to National Electric Products Corporation, a corporation of Delaware Application September 23, 1939, Serial No. 296,236

2 Claims. (Cl. 174—116)

This invention relates to non-metallic sheath cable of the sort used alternatively to metallic armored cable in housing electrical conductors.

The invention consists in a novel organization of the wrapping and binding structures included in the sheath of the cable, to give improved coherence and endurance to the cable.

The structure which has become the generally accepted one for non-metallic sheath cable is to surround the insulated conductors included in the cable with a wrapping of crumpled paper, jute, or other suitable fibrous material, to extend a plurality of filler strings of jute or paper longitudinally of the conductors, to surround this assembly with a paper dam and with a braided, or knit, envelope, and to impregnate that envelope.

There is in non-metallic sheath cable at least one substantial advantage over metallic cable, which is that, even though the individual insulation of the included conductors should be defective, there is no danger of a short-circuit between the conductive element of a conductor and the sheath of the cable. There is also the advantage of an increased flexibility in the non-metallic sheath cable; but this latter advantage is coupled with certain exigencies which it imposes upon the cable itself. Thus, in fishing the cable, or otherwise bringing it into an installed position, it is of advantage that it may be worked around obstructions. In such operation, however, the cable is necessarily subjected to severe "kinking," i. e., flexion about a plurality of relatively short non-coincident radii, and to rubbing against sharp or abrasive edges or surfaces.

It is of importance, therefore, that non-metallic sheath cable have a sheath so made that it is capable of maintaining its protection of the conductors under such severe conditions without detriment to its advantageous quality of flexibility.

We have attained by our invention a sheath structure in a non-metallic sheath cable which is very flexible, and which includes a fibrous element so formed and arranged that it is thoroughly saturated with and bonded by a heavy viscous and adhesive flame-retardant saturant. We also have succeeded in so organizing the fabric element of the sheath that, under all conditions to which the cable is normally subjected in use, it firmly supports an outer skin, or capsule, of pitchy flame-retardant and lubricating materials.

In non-metallic sheath cable our invention consists in constructing the sheath of the cable with a double layer serving or helical wrapping, which replaces the braided, or knit, structure usually included in the sheath of cable of that sort. The two servings, or layers of serving, we apply in opposition to each other so that the outer serving binds the turns of the inner serving against opening relatively to each other, and arrange the outer serving at such angle to the longitudinal axis of the cable as a whole that it is able to endure severe kinking of the cable without breakage.

Also, we so organize the two servings that a relatively heavy viscous and adhesive saturant is enabled to penetrate the outer serving to the inner one, so to bond the two servings to each other that the inner serving by the crossing of its turns with those of the outer serving is enabled to resist any tendency for the turns of the outer serving relatively to open. This opening tendency is also in measure counteracted by the fact that the outer serving is of larger size strands than is the inner serving and is less severely compacted in the assembly, so that it tends to accommodate itself to severe flexion of the cable to an extent adequate to prevent its turns from parting the pitchy outer coating of the sheath which provides a lubricating and flame-retardant encapsulation for the cable as a whole. The several elements going into the sheath of our non-metallic sheath cable are thus cooperative in protecting each other from injury or displacement.

In the accompanying drawings Fig. I is a schematic view showing in elevation apparatus for applying a double opposed serving in making up the sheath of the non-metallic sheath cable. Fig. II is a fragmentary elevational view, showing the various cable elements progressively broken away to expose to view all the said elements, but omitting any showing of saturant for the structural elements or of a protective outer coating for the cable; the cable shown in this figure of the drawings being of the oval type, and containing two conductors. Fig. III is a cross-sectional view through the inner portion of the cable assembly as organized in the manner illustrated in Fig. II, taken in the plane of the section line III—III of Fig. II. Fig. IV is a fragmentary elevation similar to Fig. II in its showing, but in which the cable is illustrated as circular in cross-section and as containing three conductors. Fig. V is a cross-sectional view of the inner portion of the cable assembly shown in Fig. IV, taken in the plane of the section line V—V of Fig. IV. Fig. VI is a fragmentary view of a completely served cable without outer coating, and with the outer serving regionally broken away to expose some of the turns of the inner serving. Fig. VII is a fragmentary elevational view of the inner assembly of a cable, showing the preferred form of conductor for inclusion in our cable, the view showing the conductor elements broken away progressively in a manner to expose to view all of such elements.

We shall now generally explain the organization of a non-metallic sheath cable in accordance with our invention. Referring initially to Fig. II of the drawings, the non-metallic sheath cable there shown has as its central elements two insulated conductors designated by reference numerals 1 and 2. These insulated conductors are each composite of a centrally disposed metallic element, or conductor proper, about which there is a sheath of rubber insulation and about this insulation there is a fibrous structure which insofar as our present invention is concerned may be braided, knit, or served. Around and between the conductors 1 and 2 there are windings of crumpled paper and a tubular paper dam is wound about both the conductors to form the inner assembly of the cable. Extending longitudinally of the conductors within the paper dam there are filler and spacer lengths of loosely twisted jute. The structural basis of the cable sheath is formed of two servings 3 and 4. In the drawings the inner serving 3, being designated simply as "serving" and the outer serving 4, being designated as "binding." As will be later explained, the inner serving may be considered to be a sealing wrap, and the outer serving may be considered a binder and protector wrap.

In Figs. IV and V the general organization is similar to that shown in Figs. II and III, but the cable contains three conductors 5, 6 and 7 within the servings 8 and 9. The conductors are braided together as appears in Fig. IV, and the cable as a whole is circular in cross section.

As appears in both Figs. II and IV of the drawings, the inner or sealing wrap of serving is laid to form a lesser angle with the longitudinal axis of the cable than is the angle formed with the longitudinal axis of the cable by the outer binder and protector wrap of the assembly. In both figures of the drawings, the lead of the serving which forms the inner sealing wrap is shown as forming an angle of approximately 50° with the longitudinal axis of the cable to have a correspondingly great lead while the binder or protector wrap is served at an angle of approximately 65° to the longitudinal axis of the conductor to have a lesser lead thereon. It is important in the cable that the serving which forms the binder wrap be laid to form a greater angle with the longitudinal axis of the conductor than does the serving which forms the inner, sealing wrap. In view of the great stresses to which the binder and protector wrap is subjected, it is important that the outer serving be laid to form an angle equal to, or greater than 60° to the longitudinal axis of the cable.

We have discovered that, in addition to advantages derived by diversity in the angular positioning of the two servings, there is substantial advantage in having diversity in the size of the strand used in the two servings and diversity in the compacting of the two servings in their assembly in the sheath structure. One reason behind this advantage will appear when it is considered that the inner serving acts in the sheath assembly as a sealing wrap, and acts not only as the chief agency mechanically confining the inner assembly of the cable, but also is an element of primary importance in the cable from the viewpoint of flame-retardance and the viewpoint of general electrical insulation.

In manufacturing the cable, the servings of the sheath are impregnated with a relatively heavy, viscous, and adhesive saturant having flame-retardant qualities. In order that the saturant may penetrate to the served sealing wrap, fully and uniformly to impregnate it, it must pass through the binder and protector wrap lying outwardly of the inner sealing wrap. If then the strands of the binder serving be of greater size than those of the inner wrap, and less compacted in the assembly, even though the turns be firmly in contact with each other, the saturant penetrates the relatively loose structure of the strands in a volume and distribution adequate fully and uniformly to impregnate the sealing wrap, so that it forms a uniformly effective electrically insulating and flame-retardant seal about the inner assembly of the cable.

On the other hand, the binder and protector wrap, lying outwardly of the sealing wrap, is itself fully impregnated, and is by the saturant caused to adhere to the inner sealing wrap of the sheath assembly. Its strands being larger than those of the sealing wrap, it is the better able mechanically to protect the sealing wrap and to maintain the integrity of the cable structure.

Referring to Figs. II and IV of the drawings, it is to be understood that the strands of the binder wraps 4 and 9 of the cables therein shown are of greater diameter than the strands 3 and 8 which are served about the inner assembly to form the sealing wraps; and that being applied in each instance outside the sealing wrap the binder wrap serves to increase the compacting effect incident to the tension of the sealing wrap as it is served.

The material of the strands in both servings of the cable sheath is such that they are capable of absorbing the saturant, being commonly of a twisted fibrous material such as cotton or paper. The saturant may be any one of various compositions commonly sold and used for the purpose of impregnating the fibrous structure of conductors and cables. Usually it is a composition of asphalt, non-mineral pitch, such as stearin pitch, and a suitable wax, such as montan wax. Outside the structural assembly of the sheath there is applied a coating of material, which may be generally similar to the saturant in its composition but which desirably contains a higher proportion of pitch.

The general steps of making the cable, chronologically stated, are to make the inner assembly of the conductor, including jute fillers and paper wrappers, to apply the opposed serving which forms the sealing wrap and the binder and protector wrap to saturate the served assembly, to apply the pitchy outer coating, and to apply a finishing coat of material such as wax, or waxy composition, to give the cable a permanently lubricated surface.

Fig. I of the drawings is generally illustrative of the manner in which both wraps desirably are served. In that schematic view two bobbin-carrying heads 10 and 11 are rotatable about the inner cable assembly, designated by reference letter A, as it progresses axially through them. Each of the heads carries a plurality of bobbins, eight bobbins being shown on each head and the bobbins for the two heads 10 and 11 being designated respectively by reference numerals 12 and 13. The heads are oppositely rotated to lay the two servings in opposed helical wrappings one over the other, the head 11 acting upon the inner assembly of the cable after the head 10 has applied the inner sealing wrap thereto.

In order that both servings be laid in the same progressive operation, to give full coverage in both the sealing wrap and the binder and protector wrap, accommodation must be made to the different angles at which the two servings are laid and the different size of the strands in the two servings. The head 11 is rotated faster than the head 10, in order that the outer serving which forms the binder and protector wrap may be laid at a greater angle to the longitudinal axis of the cable than is the inner serving. Accommodation to this variance may be made by mounting a different number of bobbins on the two bobbin-carrying heads, or if the number of bobbins on the two heads be (as shown) equal, accommodation may be made by taking a greater number of ends from each of the bobbins 12 on head 10 than from the bobbins 13 on head 11. The relationships given below may be taken as illustrative of those satisfactorily employed by us in structurally organizing the sheath structure of several cables. It should be noted that this table gives the total number of "ends" of the strands applied by each winding head in each of its revolutions, and does not divide this total into the number of bobbins on each:

|  | Size yarn in strands | No. of ends | R. P. M. head | Angle with cable axis |
|---|---|---|---|---|
|  |  |  |  | Degrees |
| Sealing wrap | 10—1 | 48 | 200 | 51 |
| Binder wrap | 12—2 | 24 | 381 | 68 |
| Sealing wrap | 10—1 | 48 | 200 | 51 |
| Binder wrap | 16—2 | 28 | 381 | 68 |
| Sealing wrap | 10—1 | 48 | 200 | 54 |
| Binder wrap | 12—2 | 24 | 381 | 70 |
| Sealing wrap | 10—1 | 48 | 200 | 54 |
| Binder wrap | 16—2 | 28 | 381 | 70 |

In the table "10—1" means No. 10 yarn in a single strand, and "12—2" means No. 12 yarn in a double strand. It will be noted that the double strand of the binder and protector wrap is in each instance greater in size than the single strand of the sealing wrap, and that a lesser number of ends is applied. In both the sealing wrap and the binder wrap the strand is applied under tension, and tensioning means 14 and 15 are indicated for each of the winding heads 10 and 11. Both wraps fully and closely cover the structure which they overlie, but the binder wrap is applied to an underlying structure of greater diameter than that about which the sealing wrap is wound. The strand of which it is formed is thus unwound more rapidly from the bobbins which carry it than is the strand forming the sealing wrap from its bobbins, and there is thus a tendency less severely to compact it as it is served. Also, the binder and protector wrap, by being served around the sealing wrap, tends to flatten out the sealing wrap, and thereby longitudinally to compact its turns one with the other.

It will be understood that the structural coherence of the sheath in our cable assembly is greater than that of a cable sheath organized with a braided structure. It is also of importance that the continuity of the insulation is in our assembly superior to that existing in a non-metallic sheath cable in which the sheath contains a braided envelope. This is because a saturant of relatively heavy and viscous sort may effectively penetrate the binder and protector wrap, through the relatively uncompacted structure thereof, in such volume and distribution as fully and smoothly to impregnate the sealing wrap. In a sheath containing two braided structures there is, on the contrary, a tendency for the saturant to penetrate at intervals between crossed strands of the outer braid, unequally to spread in and non-uniformly to impregnate the inner braid.

It will be noted that the conductors 1 and 2, shown in Fig. II of the drawings, include braided envelopes, and that this is true also of the conductors 5, 6 and 7, as shown in Fig. IV of the drawings. On the contrary the conductor 14, which appears in Fig. VII of the drawings, is a conductor of a structure which is preferred by us, being made in accordance with the disclosure of our co-pending application Serial No. 181,910, filed December 27, 1937, upon which Patent No. 2,222,555, issued November 19, 1940, and our Serial No. 224,522, filed August 12, 1938. This conductor 14, shown in Fig. VII, has its core surrounded by a helical serving 15 having its turns locked in position by a binder filament 16 laid helically in opposition to the lay of the serving. The purpose of showing conductors of these two diverse sorts is to illustrate that the structure of the cable sheath bears no essential relation to the specific form of conductors included in the cable, and incidentally to illustrate that the conductor of our co-pending applications may suitably be so included.

In Fig. VI of the drawings, the inner and outer servings as designated respectively by reference letters B and C, for the reason that the cable as a whole may be either of the form shown in Figs. II and III or the form shown in Figs. IV and V. This figure of the drawings indicates the manner in which the turns of the two servings shift slightly in flexion of the cable, without becoming widely separated at any point. It indicates how this effect occurs by action of the two serving layers substantially as a single integrated structure.

We claim as our invention:

1. In non-metallic sheath cable constructed with an inner assembly consisting of a plurality of conductors and insulating packing and an exterior non-metallic insulating and protective sheath; a sheath composite of an inner sealing wrap of absorbent strands laid in a single layer helical serving, and an outer binder and protector wrap of absorbent strands greater in size than the strands of the sealing wrap laid as a single layer helical serving with a lesser number of turns than the sealing wrap in a helix opposite in sense to that in which the turns of the sealing wrap are laid and with a lesser lead, the said binder and protector wrap by its lesser lead forming with the longitudinal axis of the cable an angle greater than that formed therewith by the turns of the sealing wrap, the said two wraps being saturated and bonded together by a heavy viscous and adhesive insulating saturant.

2. In non-metallic sheath cable constructed with an inner assembly consisting of a plurality of conductors and an exterior non-metallic insulating and protective sheath; a sheath composite of an inner sealing wrap of absorbent strands laid in a single layer helical serving with its turns in contact and compacted longitudinally of the sheath, and an outer binder and protector wrap of absorbent strands greater in size than the strands of the sealing wrap laid as a single layer helical serving with a lesser number of turns than the sealing wrap in a helix opposite in sense to that in which the turns of the sealing wrap are laid and with its turns in contact with each other but less severely compacted longitudinally of the cable and being physically in condition for facilitated penetration of saturant through the outer wrap of the assembly to the inner wrap thereof, the binder and protector wrap being laid with a lesser lead than the lead of the inner sealing wrap to form relatively a greater angle with the longitudinal axis of the cable, the two said wraps being saturated and bonded together by a heavy viscous and adhesive insulating saturant.

WILLIAM C. ROBINSON.
RALPH W. E. MOORE.